United States Patent Office 3,037,589
Patented June 5, 1962

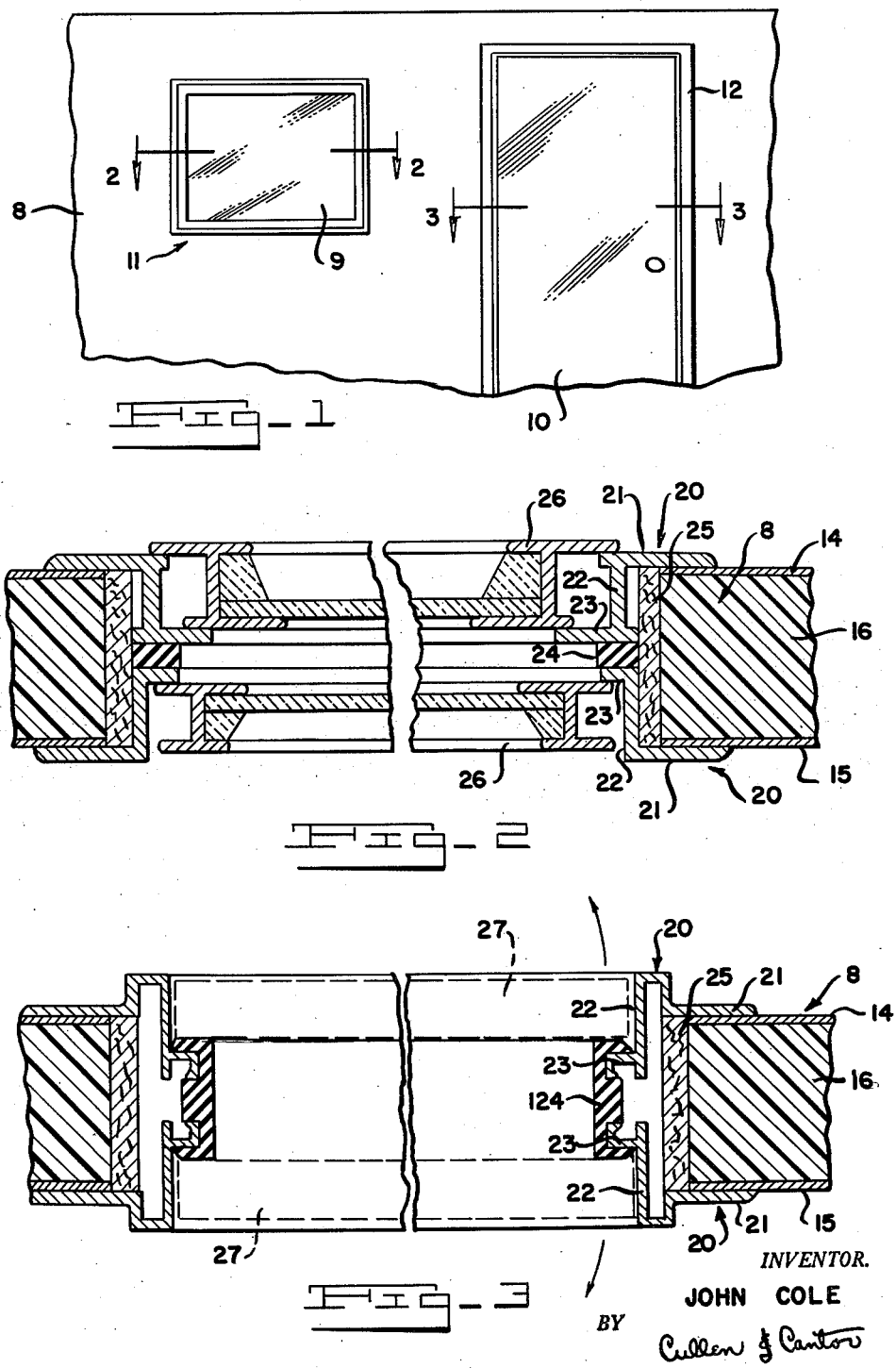
June 5, 1962  J. COLE  3,037,589
FRAME CONSTRUCTION FOR WALL OPENINGS
Filed March 14, 1960
INVENTOR.
JOHN COLE
BY
ATTORNEYS

3,037,589
FRAME CONSTRUCTION FOR WALL OPENINGS
John Cole, 25520 York Road, Royal Oak, Mich.
Filed Mar. 14, 1960, Ser. No. 14,916
5 Claims. (Cl. 189—34)

This application relates to frame constructions for wall openings and particularly for openings in walls having metal skins on inner and outer faces. The opening may be for a window or door or a double window or double door and the frame construction has for a principal object to provide a frame designed to avoid heat transfer between the wall surfaces at the opening.

For an understanding of the invention references should be had to the appended drawing. In this drawing, FIG. 1 is a small scale view showing a wall having openings therein.

FIGS. 2 and 3 are enlarged views as if in section on lines 2—2 and 3—3 of FIG. 1.

The drawing shows a wall 8 having openings 9—10 surrounded by 11—12 frames. The wall has an inner metal skin 14 and an outer metal skin 15 and an insulation filler 16 between them which may be of any suitable light weight insulation material, with the skins being of any suitable metal such as aluminum. The edges of the metal skins are exposed to the openings and are framed by frames now to be described.

Each frame comprises two metal ogee section members 20, one on each side of the wall and each having three flanges 21—22—23. The three flanges of each such member are positioned respectively as follows: Flange 21 overlaps the wall skin. The next flange 22, transverse to the flange 21, is within the opening. The third flange 23, transverse to the flange 22 and thus parallel to flange 21, is also within the opening. The frame has its two ogee members 20 transversely spaced as shown so as to be out of contact with each other to avoid heat transfer between them. An insulated resilient connector strip 24 connects the two third flanges 23 of the two members 20. An insulation and resilient gasket 25 is positioned between the edge of the wall and the flanges 22.

When the construction is to be used as a window construction as shown in FIG. 2 one or both of the flanges 23 are extended so as to provide exposed outer faces or rails for sliding windows 26 and in such case the connector strip 24 is between the flanges 23 and leaves the outer surfaces of these flanges exposed for such purpose. On the other hand as shown in FIG. 3 where the frame is to be used as a frame for one or more doors 27 the connector strip 124 may be permitted to embrace and cover the edges of the flanges 23 in which case the connector strip provides bearings against which the doors close for sealing and shock absorbing purposes.

Now having described the construction herein disclosed reference should be had to the claims which follow.

I claim:

1. Frame construction for a wall opening comprising a wall having an opening, said wall having an inner metal skin, an outer metal skin, and an insulation filler between the skins, with the edges of the metal skins being exposed to the opening, and a frame for said opening comprising two metal ogee section members, one on each side of the wall, with the three flanges of each such member being positioned respectively, one, overlapping a wall skin, the next, transverse to the first flange, being within the opening, and the third, transverse to the second flange, also being within the opening; the frame having its two ogee members transversely spaced so as to be out of contact with each other, and an insulated resilient connector strip connecting the two third flanges of the two ogee members, there also being an insulation and resilient gasket between the edge of the wall and the second flanges of the two ogee members.

2. A construction according to claim 1 wherein the connector strip is between the third flanges and leaves their outer surfaces exposed to provide bearing faces for closures for said opening.

3. Frame construction for a wall opening comprising two metal ogee section members, one on each side of the wall, with the three flanges of each such member being positioned respectively, one, overlapping a wall face, the next, transverse to the first flange, being within the opening, and the third, transverse to the second flange also being within the opening; the frame having its two ogee members transversely spaced so as to be out of contact with each other; and an insulated resilient connector strip connecting the two third flanges of the two ogee members.

4. A construction according to claim 3 wherein there is an insulation and resilient gasket between the edge of the wall and the second flanges of the two ogee members.

5. A construction according to claim 3 wherein the connector strip is between the third flanges and leaves their outer surfaces exposed to provide bearing faces for closures for said opening.

References Cited in the file of this patent
UNITED STATES PATENTS
2,582,765    Brew _____ Jan. 15, 1952